United States Patent
Zhang et al.

(10) Patent No.: US 11,900,959 B2
(45) Date of Patent: Feb. 13, 2024

(54) SPEECH EMOTION RECOGNITION METHOD AND APPARATUS

(71) Applicant: Huawei Technologies Co., Ltd., Shenzhen (CN)

(72) Inventors: Yang Zhang, Shenzhen (CN); Oxana Verkholyak, St. Petersburg (RU); Alexey Karpov, St. Petersburg (RU); Li Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 17/451,061

(22) Filed: Oct. 15, 2021

(65) Prior Publication Data
US 2022/0036916 A1    Feb. 3, 2022

Related U.S. Application Data

(63) Continuation of application No. PCT/CN2020/085188, filed on Apr. 16, 2020.

(30) Foreign Application Priority Data

Apr. 16, 2019   (RU) ............. RU2019111375

(51) Int. Cl.
   *G10L 25/63*   (2013.01)
   *G10L 25/30*   (2013.01)
   *G10L 19/038*  (2013.01)
   *G10L 15/04*   (2013.01)
   *G10L 15/16*   (2006.01)

(52) U.S. Cl.
   CPC .......... *G10L 25/63* (2013.01); *G10L 15/16* (2013.01); *G10L 15/04* (2013.01); *G10L 19/038* (2013.01); *G10L 25/30* (2013.01)

(58) Field of Classification Search
   CPC ....... G10L 25/63; G10L 25/30; G10L 19/038; G10L 15/04
   See application file for complete search history.

(56) References Cited

FOREIGN PATENT DOCUMENTS

| CN | 109036467 A | 12/2018 |
| CN | 109243492 A | 1/2019 |
| CN | 109493886 A | 3/2019 |
| CN | 109599128 A | 4/2019 |
| KR | 20200075123 A | * 12/2018 ............. G10L 25/63 |
| WO | 2019017462 A1 | 1/2019 |

OTHER PUBLICATIONS

Lee, C.-C. et al., "Modeling Mutual Influence of Interlocutor Emotion States in Dyadic Spoken Interactions", Interspeech 2009 Brighton, Sep. 6-10, 2009, pp. 1983-1986.

* cited by examiner

*Primary Examiner* — Farzad Kazeminezhad
(74) *Attorney, Agent, or Firm* — Slater Matsil, LLP

(57) ABSTRACT

A plurality of pieces of emotional state information corresponding to a plurality of speech frames in a current utterance are obtained based on a first neural network model; statistical operation is performed on the plurality of pieces of emotional state information, to obtain a statistical result, and then the emotional state information corresponding to the current utterance is obtained based on a second neural network device, the statistical result corresponding to the current utterance, and statistical results corresponding to a plurality of utterances before the current utterance.

23 Claims, 9 Drawing Sheets

SPEECH EMOTION RECOGNITION METHOD AND APPARATUS

CROSS-REFERENCE TO RELATED APPLICATIONS

This application is a continuation of International Application No. PCT/CN2020/085188, filed on Apr. 16, 2020, which claims priority to Russian Patent Application No. RU2019111375, filed on Apr. 16, 2019. The disclosures of the aforementioned applications are hereby incorporated by reference in their entireties.

TECHNICAL FIELD

This application relates to the field of natural language processing, and more specifically, to a speech emotion recognition method and apparatus.

BACKGROUND

Artificial intelligence (AI) is a theory, method, technology, and application system that simulates, extends, and expands human intelligence, perceives an environment, obtains knowledge, and uses the knowledge to obtain an optimal result by using a digital computer or a digital computer controlled machine. In other words, artificial intelligence is a branch of computer science, and seeks to learn essence of intelligence and produce a new intelligent machine that can react in a way similar to human intelligence. Artificial intelligence is to study design principles and implementation methods of various intelligent machines, and enable the machines to have functions of sensing, inference, and decision-making.

With continuous development of artificial intelligence technologies, emotional interaction plays an important role in human information communication. An emotion recognition technology is one of basic technologies of human-computer interaction. Currently, researchers are working to enable artificial intelligence assistants to understand people's emotions through voices, and implement more personalized communication by learning and recognizing emotions such as anxiety, excitement, and anger in the voices.

Most of existing speech emotion recognition technologies recognize an emotion of a speaker mainly based on speech analysis of a single sentence (a current utterance), without considering a speech context, leading to inaccurate emotion recognition.

SUMMARY

This application provides a speech emotion recognition method and apparatus, to achieve a more accurate speech emotion recognition effect.

According to a first aspect, a speech emotion recognition method is provided, where the method includes: determining, based on a first neural network model, a plurality of pieces of emotional state information corresponding to a plurality of speech frames included in a current utterance in a target dialog, where one speech frame corresponds to one piece of emotional state information, and the emotional state information represents an emotional state corresponding to the speech frame; performing statistical operation on the plurality of pieces of emotional state information to obtain a statistical result, where the statistical result is a statistical result corresponding to the current utterance; and determining, based on a second neural network model, the statistical result corresponding to the current utterance, and n-1 statistical results corresponding to n-1 utterances before the current utterance, the emotional state information corresponding to the current utterance, where the n-1 utterances are in a one-to-one correspondence with the n-1 statistical results, a statistical result corresponding to any utterance in the n-1 utterances is obtained by performing statistical operation on a plurality of pieces of emotional state information corresponding to a plurality of speech frames included in the utterance, the n-1 utterances belong to the target dialog, and n is an integer greater than 1.

According to the method provided in this application, the plurality of pieces of emotional state information corresponding to the plurality of speech frames in the current utterance can be obtained based on the first neural network model, and then the emotional state information corresponding to the current utterance can be obtained based on the second neural network device, the statistical result corresponding to the current utterance, and the statistical results corresponding to the plurality of utterances before the current utterance. Therefore, impact of a context of the current utterance on the emotional state information corresponding to the current utterance can be learned more fully by using the two levels of neural network models: the first neural network model and the second neural network model, so that a more accurate speech emotion recognition effect can be achieved.

Optionally, the statistical operation includes but is not limited to one or more of calculating an average, calculating a variance, calculating an extremum, calculating a coefficient of linear fitting, and calculating a coefficient of higher order fitting. Correspondingly, the statistical result includes but is not limited to one or more of an average, a variance, an extremum, a coefficient of linear fitting, and a coefficient of higher order fitting.

With reference to the first aspect, in some implementations of the first aspect, the n-1 utterances include speech data of a plurality of speakers. That is, the n-1 utterances are dialogs of a plurality of speakers.

Based on this solution, speech recognition is performed based on the dialogs of the plurality of speakers. Compared with performing speech emotion recognition based on a sentence of a speaker in a conventional technology, a more accurate speech emotion recognition effect can be achieved.

With reference to the first aspect, in some implementations of the first aspect, the plurality of speakers include a speaker corresponding to the current utterance; and the determining, based on a second neural network model, the statistical result corresponding to the current utterance, and n-1 statistical results corresponding to n-1 utterances before the current utterance, the emotional state information corresponding to the current utterance includes: determining, based on the second neural network model, the statistical result corresponding to the current utterance, the n-1 statistical results, and genders of the plurality of speakers, the emotional state information corresponding to the current utterance.

When speech emotion recognition is performed based on the genders of the speakers, a more accurate speech emotion recognition result can be achieved.

With reference to the first aspect, in some implementations of the first aspect, the n-1 utterances are adjacent in terms of time. In other words, there is no other speech data between any two utterances in the n-1 utterances.

With reference to the first aspect, in some implementations of the first aspect, the determining, based on a second neural network model, the statistical result corresponding to the current utterance, and n-1 statistical results corresponding to n-1 utterances before the current utterance, the emotional state information corresponding to the current utterance includes: determining, based on the statistical result corresponding to the current utterance and the n-1 statistical results, round features respectively corresponding to w rounds corresponding to n utterances: the current utterance and the n-1 utterances, where a round feature corresponding to any round is determined based on statistical results corresponding to utterances of all speakers in the round, and w is an integer greater than or equal to 1; and determining, based on the second neural network model and the round features respectively corresponding to the w rounds, the emotional state information corresponding to the current utterance.

Specifically, for example, each round includes speech data of two speakers: A and B. The round feature corresponding to any round is determined based on a statistical result corresponding to A and a statistical result corresponding to B in this round of dialog. For example, a round feature corresponding to a current round corresponding to the current utterance is vector stitching of statistical results corresponding to utterances included in the current round. Further, the round feature may alternatively be determined based on genders of A and B. For example, the round feature corresponding to the current round corresponding to the current utterance is vector stitching of the statistical results corresponding to the utterances included in the current round and genders of speakers corresponding to the current round. In this application, the w round features may be input to the second neural network model, and an output of the second neural network model is the emotional state information corresponding to the current utterance.

Optionally, one utterance is one sentence, and therefore, one utterance corresponds to one speaker.

Therefore, according to the method provided in this application, speech emotion recognition is performed based on the speech data of the plurality of speakers before the current utterance, namely, based on context information of a plurality of rounds of dialogs. Compared with performing speech emotion recognition based on a single sentence in the conventional technology, a more accurate speech emotion recognition effect can be achieved.

With reference to the first aspect, in some implementations of the first aspect, w is a value entered by the user.

With reference to the first aspect, in some implementations of the first aspect, the method further includes: presenting the emotional state information corresponding to the current utterance to a user.

With reference to the first aspect, in some implementations of the first aspect, the method further includes: obtaining a correction operation performed by the user on the emotional state information corresponding to the current utterance.

Further, the method further includes: updating a value of w.

In other words, if a prediction result is not expected by the user, the user may correct the prediction result. After recognizing the correction operation of the user, a speech emotion recognition apparatus may update the value of w, to achieve a more accurate prediction result.

With reference to the first aspect, in some implementations of the first aspect, the first neural network model is a long short-term memory (long short-term memory, LSTM) model; and/or the second neural network model is an LSTM.

Because the LSTM model has a relatively good memory capability, the LSTM model can learn impact of a dialog context on the emotional state information corresponding to the current utterance more fully, so that a more accurate speech emotion recognition effect can be achieved.

It should be understood that, the first neural network model and the second neural network model may be the same or different. This is not limited in this application.

With reference to the first aspect, in some implementations of the first aspect, the determining, based on a first neural network model, a plurality of pieces of emotional state information corresponding to a plurality of speech frames included in a current utterance in a target dialog includes: for each speech frame in the plurality of speech frames, determining, based on the first neural network model, a feature vector corresponding to the speech frame, and feature vectors respectively corresponding to q-1 speech frames before the speech frame, emotional state information corresponding to the speech frame, where the q-1 speech frames are speech frames of the speaker corresponding to the current utterance, q is an integer greater than 1, and a feature vector of the speech frame k represents an acoustic feature of the speech frame k.

Optionally, the acoustic feature includes but is not limited to one or more of energy, a fundamental frequency, a zero-crossing rate, a Mel frequency cepstral coefficient (MFCC), and the like. For example, the foregoing acoustic features may be stitched to obtain a feature vector of each speech frame.

With reference to the first aspect, in some implementations of the first aspect, any two speech frames in the q speech frames are spaced by m speech frames, where m is an integer greater than or equal to 0.

Based on this technical solution, when m is not 0, a context included in a window corresponding to a speech frame can be enlarged when a window sequence is prevented from being excessively long, so that accuracy of the prediction result can be further improved.

According to a second aspect, a speech emotion recognition apparatus is provided, where the apparatus includes modules configured to perform the method in the first aspect.

According to a third aspect, a speech emotion recognition apparatus is provided, where the apparatus includes: a memory, configured to store programs; and a processor, configured to execute the programs stored in the memory, where when the programs stored in the memory are executed, the processor is configured to perform the method in the first aspect.

According to a fourth aspect, a computer-readable medium is provided, where the computer-readable medium stores program code for execution by a device, and the program code includes program code for performing the method in the first aspect.

According to a fifth aspect, a computer program product including instructions is provided. When the computer program product runs on a computer, the computer is enabled to perform the method in the first aspect.

According to a sixth aspect, a chip is provided. The chip includes a processor and a data interface. The processor reads, by using the data interface, instructions stored in a memory, to perform the method in the first aspect.

Optionally, in an implementation, the chip may further include a memory, the memory stores instructions, the processor is configured to execute the instructions stored in the memory, and when the instructions are executed, the processor is configured to perform the method in the first aspect.

According to a seventh aspect, an electronic device is provided. The electronic device includes the action recognition apparatus in any one of the second aspect to the fourth aspect.

DETAILED DESCRIPTION OF ILLUSTRATIVE EMBODIMENTS

The following describes technical solutions of this application with reference to accompanying drawings.

To enable a person skilled in the art to better understand this application, a scenario to which this application can be applied is first briefly described with reference to FIG. 1 and FIG. 2.

Figure 1:
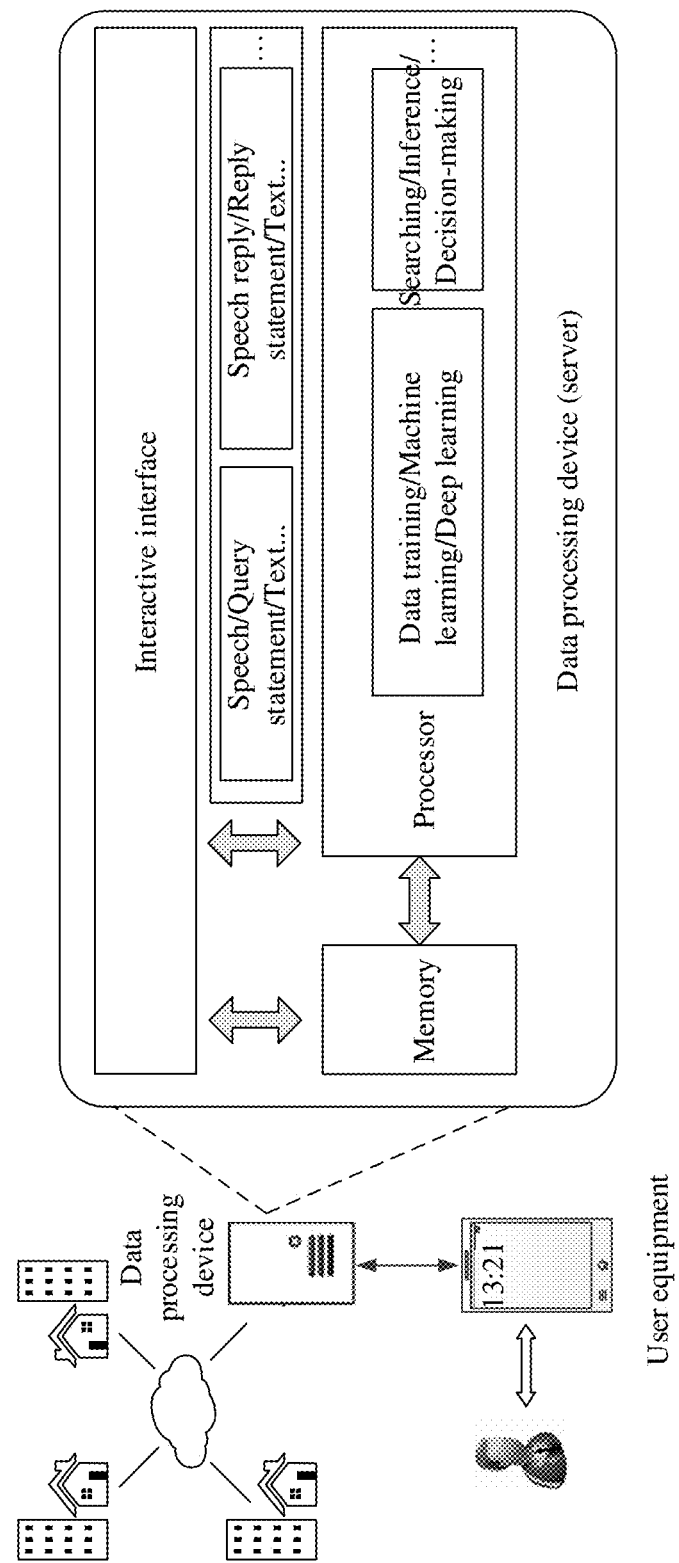
FIG. 1 is a schematic diagram of a natural language processing system.

FIG. 1 is a schematic diagram of a natural language processing system. Referring to FIG. 1, the system includes user equipment and a data processing device. The user equipment includes a user and an intelligent terminal such as a mobile phone, a personal computer, or an information processing center. The user equipment is an initiating end of natural language data processing, and serves as an initiator of a request such as a language question and answer or a query. Usually, a user initiates a request by using the user equipment.

The data processing device may be a device or server that has a data processing function, such as a cloud server, a network server, an application server, or a management server. The data processing device receives, by using the interactive interface, a question sentence such as a query statement/speech/text from the intelligent terminal, and then performs language data processing in manners such as searching, inference, and decision-making through machine learning and deep learning by using a memory that stores data and a processor link that processes data. The memory may be a general term, including local storage and a database that stores historical data. The database may be located on the data processing device or on another network server.

Figure 2:
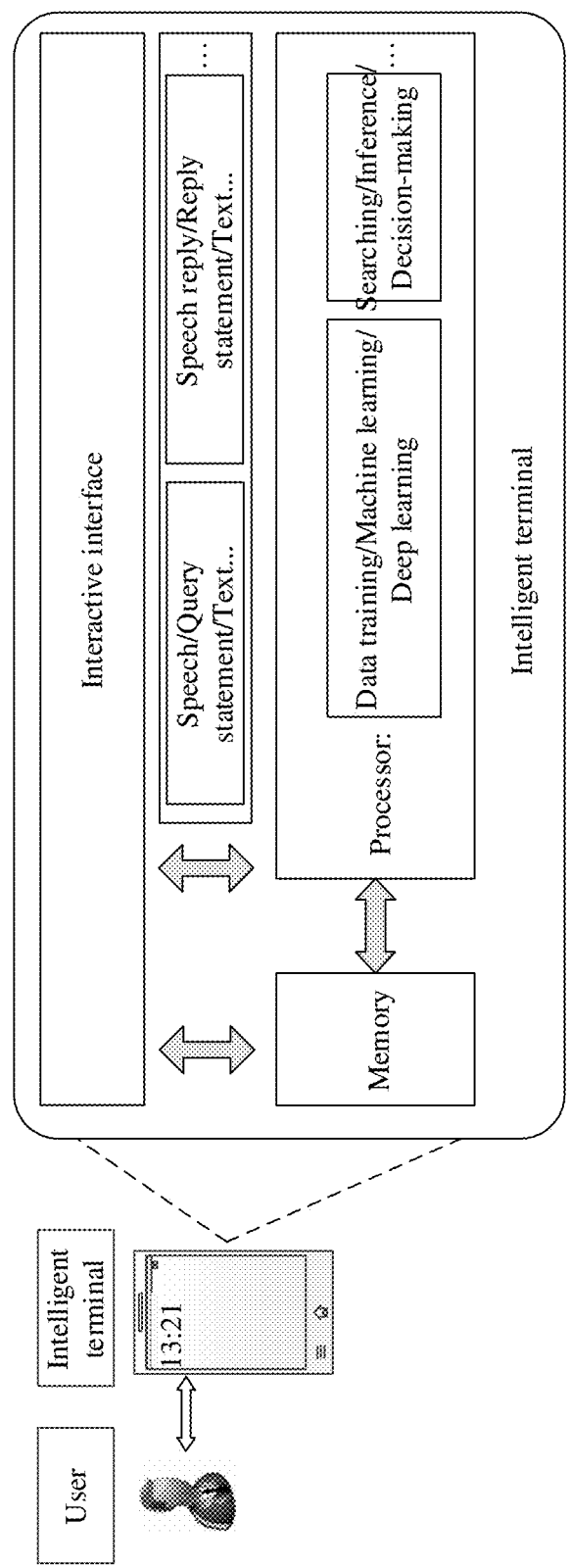
FIG. 2 is a schematic diagram of another application scenario of a natural language processing system.

FIG. 2 shows another application scenario of a natural language processing system. In this scenario, an intelligent terminal is directly used as a data processing device and directly receives an input from a user, and natural language processing is directly performed by hardware of the intelligent terminal itself. A specific process is similar to that in FIG. 1. For details, refer to the foregoing description. Details are not described herein again.

Emotional interaction plays an important role in human information communication. Researches show that 80% of information in human communication is emotional information. Therefore, emotion computing is an essential part for implementing a humanized human-computer interaction process, and an emotion recognition and understanding technology is one of basic technologies of human-computer interaction.

Most of existing intelligent assistants, such as Apple's Siri and Amazon's Alexa, mainly perform question and answer interaction based on knowledge, but researchers are working to help artificial intelligence assistants understand people's emotions through voices, and implement more personalized communication by learning and recognizing emotions such as anxiety, excitement, and anger in the voices. For example, when recognizing that a tone of a user's voice is deep, an intelligent assistant plays a cheerful song for the user, or the intelligent assistant tells the user a white lie, by telling the user that the user's friend sounds depressed, and advising the user to accompany the friend of the user to an uplifting movie.

An emotion in speech is affected by a speech context, but most of existing speech emotion recognition technologies recognize an emotion of a speaker mainly based on speech analysis of a single sentence (a current utterance), without considering a speech context, leading to inaccurate emotion recognition.

Further, in a dialog, not only previous speech of a speaker affects a current emotion, but also speech and an emotional state of the other party affect the current emotion. In an actual situation, the emotional state in the dialog is affected by two different levels of a speech context. One is a level of a speech flow, namely, impact of a frame previous to a current frame and a frame next to the current frame on speech of the current frame. The other is impact of previous rounds in the dialog on a statement of a current round. In this case, if the emotion of the speaker is analyzed based only on speech analysis of a single sentence (the current utterance) and a context of the dialog is not considered, a prediction result in a multi-round interaction scenario is not sufficiently accurate or appropriate.

To resolve the foregoing problem, this application provides a speech emotion recognition method and apparatus. A more accurate emotion recognition effect can be achieved by introducing speech context information into a speech emotion recognition process.

The speech emotion recognition method provided in this application may be applied to a field with a natural human-computer interaction requirement. Specifically, according to the method in this application, when speech emotion recognition is performed on an input dialog speech data flow, an emotional state corresponding to current speech, such as pleasure or anger, can be recognized. Subsequently, the recognized real-time emotional state can be used to formulate a dialog reply policy, distribute customer service personnel corresponding to a call, adjust teaching progress, and the like based on different application scenarios. For example, a speech assistant may adjust a speech answer policy based on recognized emotional changes and emotional changes in a dialog process of a user, to implement more personalized human-computer interaction. In addition, a customer service system may use the speech assistant to sort users of a call service center based on emergency degrees, thereby improving service quality. For example, users with relatively intense negative emotions may be identified in a timely manner and their calls may be transferred to the customer service personnel in a timely manner, thereby optimizing user experience. A distance education system may use the speech assistant to monitor emotional states of users of a remote network class in a learning process, to adjust a teaching emphasis or progress in a timely manner. A hospital may use the speech assistant to track emotional changes of patients with depression, and further use the emotional changes as a basis for diagnosis and treatment of a disease, and use the speech assistant to assist and guide children with autism in learning emotional understanding and expression abilities, and the like.

The speech emotion recognition apparatus provided in this application may be the data processing device shown in FIG. 1, a unit or a module in the data processing device shown in FIG. 1, or the like. In addition, the speech emotion recognition apparatus provided in this application may alternatively be the user equipment shown in FIG. 2, a unit or a module in the data processing device shown in FIG. 2, or the like. For example, the data processing device shown in FIG. 1 may be a cloud server, and the speech emotion recognition apparatus may be a dialog speech emotion recognition service application programming interface (API) on the cloud server. In another example, the speech apparatus may be a speech assistant application (APP) in the user equipment shown in FIG. 2.

For example, the speech emotion recognition apparatus provided in this application may be an independent dialog speech emotion recognition software product, a dialog speech emotion recognition service API on a public cloud, or a functional module embedded in a speech interaction product, such as an intelligent speaker, a speech assistant APP on a mobile phone, intelligent customer service software, or an emotion recognition module in a distance education system. It should be understood that, the product forms listed herein are described as examples, and should not constitute any limitation on this application.

Figure 3:
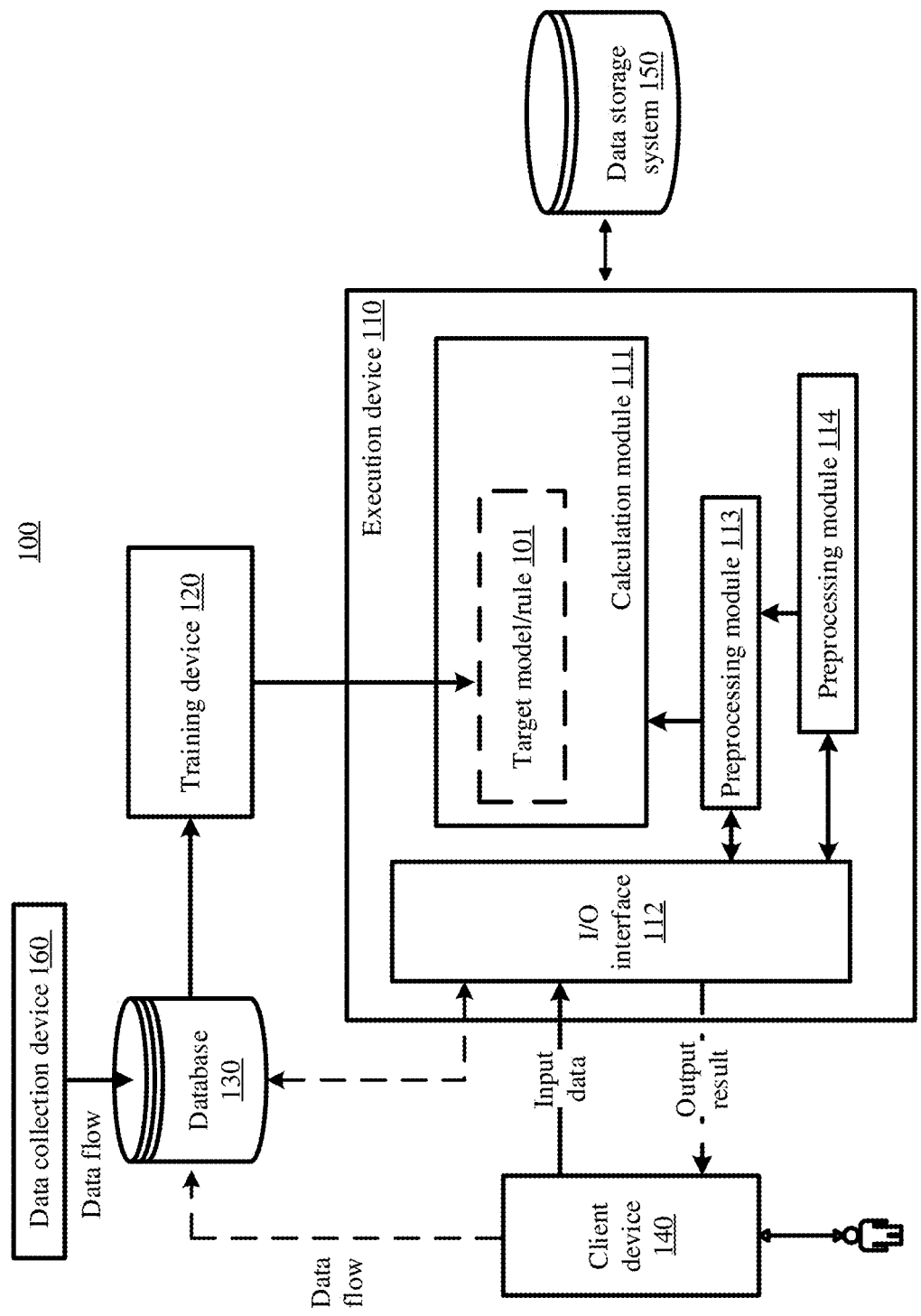
FIG. 3 is a schematic structural diagram of a system architecture according to an embodiment of this application.

The following describes, with reference to a system architecture shown in FIG. 3, a training process of a model used in this application.

As shown in FIG. 3, an embodiment of this application provides a system architecture 100. In FIG. 3, a data collection device 160 is configured to collect a training corpus. In this application, speech of a dialog between a plurality of people (for example, two people or more) may be used as the training corpus. The training corpus includes two types of annotations: one is annotation of emotional state information for each frame, and the other is annotation of emotional state information for each utterance. Moreover, a speaker of each utterance is marked in the training corpus. Further, a gender of the speaker may be further marked. It should be understood that, each utterance may be segmented into a plurality of speech frames. For example, each utterance may be segmented into frames based on a frame length of 25 ms and a frame shift of 10 ms, to obtain a plurality of speech frames corresponding to each utterance.

It should be noted that, any emotional state representation method may be used for emotional state information in this application. At present, two emotional state representations are commonly used in the industry: discrete representation, for example, adjective label forms such as happy and angry; and dimensional representation, to be specific, an emotional state is described as a point (x, y) in multidimensional emotional space. For example, the emotional state information in this embodiment of this application may be represented by using arousal-valence space model. To be specific, the emotional state information may be represented by using (x, y). In the arousal-valence space model, a vertical axis is an arousal dimension, and describes emotional intensity; and a horizontal axis is a valence dimension, and evaluates positive and negative degrees of emotions. For example, x and y may be separately described by using values of 1 to 5, but this is not limited in this application.

After the training corpus is collected, the data collection device 160 stores the training corpus into a database 130, and a training device 120 obtains a target model/rule 101 through training based on the training corpus maintained in the database 130.

The target model/rule 101 is a two-level neural network device model, namely, a first neural network model and a second neural network model. The following describes a process in which the training device 120 obtains the first neural network model and the second neural network model based on the training corpus.

Each utterance of each speaker in the training corpus is segmented into frames based on a particular frame length and frame shift, to obtain a plurality of speech frames corresponding to each utterance. Next, a feature vector of each frame is obtained. The feature vector represents an acoustic feature of a speech frame. The acoustic feature includes but is not limited to one or more of energy, a fundamental frequency, a zero-crossing rate, a Mel frequency cepstral coefficient (MFCC), and the like. For example, the foregoing acoustic features may be stitched to obtain a feature vector of each speech frame. A feature vector of each current frame is combined with feature vectors of q-1 previous frames to form a window sequence with a length of q, where q is an integer greater than 1. Optionally, to enlarge a context included in a window without making the window sequence excessively long, a downsampling method may be used. That is, one frame is selected for every m frames and added to the sequence. m is a positive integer. Each window sequence is used as one training sample, and all training samples are used as an input, so that the first neural network model can be obtained through training. In this application, the first neural network model may be an LSTM model. However, this is not limited in this application. For example, the first neural network model in this application may use a two-layer structure, respectively with 60 hidden layer neurons and 80 hidden layer neurons, and a loss function is a mean squared error (MSE).

A statistical result corresponding to each utterance is determined. Specifically, for each speech frame, the first neural network model may output an emotional state information prediction result. A statistical result corresponding to each utterance can be obtained by performing statistical operation on emotional state information corresponding to all or some speech frames corresponding to the utterance. For example, the statistical operation includes but is not limited to one or more of calculating an average, calculating a variance, calculating an extremum, calculating a coefficient of linear fitting, and calculating a coefficient of higher order fitting. Correspondingly, the statistical result includes but is not limited to one or more of an average, a variance, an extremum, a coefficient of linear fitting, and a coefficient of higher order fitting.

Then, statistics corresponding to each utterance may be stitched with statistics respectively corresponding to a plurality of utterances before the utterance to serve as an input, to obtain the second neural network model through training. Further, the statistics and a speaker corresponding to each utterance may be stitched with the statistics and speakers respectively corresponding to the plurality of utterances before the utterance to serve as an input, to obtain the second neural network model through training. Alternatively, a round feature corresponding to each round and round features respectively corresponding to a plurality of previous rounds may be used as an input, to obtain the second neural network model through training. For example, a round feature corresponding to any round may be obtained by stitching statistical results corresponding to utterances corresponding to all speakers in the round. Further, the round feature corresponding to any round may be obtained by stitching the statistical results corresponding to the utterances corresponding to all the speakers in the round and genders of all the speakers. The stitching may be vector stitching, or may be weighted summation operation. A specific manner of stitching is not limited in this application. In this application, the second neural network model may be an LSTM model. However, this is not limited in this application. For example, the second neural network model may use a one-layer structure with 128 hidden layer neurons, and a loss function is MSE.

Because the LSTM model has a relatively good memory capability, the LSTM model can learn impact of a dialog context on the emotional state information corresponding to the current utterance more fully, so that a more accurate speech emotion recognition effect can be achieved.

It should be understood that, in this application, the first neural network model and the second neural network model may be recurrent neural network models. The first neural network model and the second neural network model may be the same or different. This is not limited in this application.

After the training of the target model/rule 101 is completed, that is, the first neural network model and the second neural network model are obtained, the speech emotion recognition method in this embodiment of this application may be implemented by using the target model/rule 101. That is, the emotional state information of the current utterance can be obtained by inputting a target dialog into the target module/rule 101. It should be understood that, the model training process described above is merely an example of an implementation of this application, and should not constitute any limitation on this application.

It should be noted that, in actual application, the training corpus maintained in the database 130 is not necessarily collected by the data collection device 160, and may alternatively be received from another device. In addition, it should be noted that the training device 120 does not necessarily train the target model/rule 101 completely based on the training corpus maintained by the database 130, and may alternatively obtain the training corpus from a cloud or another place to perform model training. The foregoing description should not be used as a limitation on this embodiment of this application.

The target model/rule 101 obtained by the training device 120 through training may be applied to different systems or devices, for example, applied to an execution device 110 shown in FIG. 3. The execution device 110 may be a terminal, such as a mobile phone terminal, a tablet computer, a notebook computer, an augmented reality (AR) AR/virtual reality (VR), or a vehicle-mounted terminal, or may be a server or a cloud. In FIG. 3, the execution device 110 configures an input/output (I/O) interface 112, for data exchange with an external device. A user may enter data to the I/O interface 112 by using a client device 140. In this embodiment of this application, the input data may include a target dialog input by the client device.

A preprocessing module 113 and a preprocessing module 114 are configured to perform preprocessing based on the input data (for example, the target dialog) received by the I/O interface 112. In this embodiment of this application, there may alternatively be no preprocessing module 113 or preprocessing module 114 (or there may be only one preprocessing module therein). The input data is processed directly by using a calculation module 111.

In a process in which the execution device no preprocesses the input data, or the calculation module 111 of the execution device 110 performs related processing such as calculation, the execution device 110 may invoke data, code, and the like in a data storage system 150 for the corresponding processing, or may store data, instructions, and the like obtained through the corresponding processing into the data storage system 150.

Finally, the I/O interface 112 returns a processing result, such as the foregoing obtained emotional state information of the current utterance, to the client device 140, so that the emotional state information is provided for the user. It should be understood that, the I/O interface 112 may alternatively not return the emotional state information of the current utterance to the client device 140. This is not limited in this application.

It should be noted that, for different objectives or different tasks, the training device 120 may generate corresponding target models/rules 101 based on different training data, where the corresponding target models/rules 101 may be used to achieve the foregoing objectives or complete the foregoing tasks, thereby providing required results for the user.

In the case shown in FIG. 3, the user may manually select the input data. The manual selection may be operated by using an interface provided by the I/O interface 112. In another case, the client device 140 may automatically send the input data to the I/O interface 112. If the client device 140 is required to obtain authorization of the user before automatically sending the input data, the user may set a corresponding permission in the client device 140. The user may view, on the client device 140, a result output by the execution device 110, and a specific presentation form may be a specific manner such as display, sound, or action. The client device 140 may also serve as a data collection end, collect input data input to the I/O interface 112 and an output result output from the I/O interface 112 shown in the figure as a new training corpus, and store the new training corpus into the database 130. Certainly, the client device 140 may not perform collection, but the I/O interface 112 directly stores the input data input to the I/O interface 112 and the output result output from the I/O interface 112 shown in the figure as the new training corpus into the database 130.

It should be noted that FIG. 3 is merely a schematic diagram of a system architecture according to an embodiment of this application. Location relationships among devices, components, modules, and the like shown in the figure constitute no limitation. For example, in FIG. 3, the data storage system 150 is an external memory relative to the execution device 110. In other cases, the data storage system 150 may alternatively be placed in the execution device 110.

Figure 4:
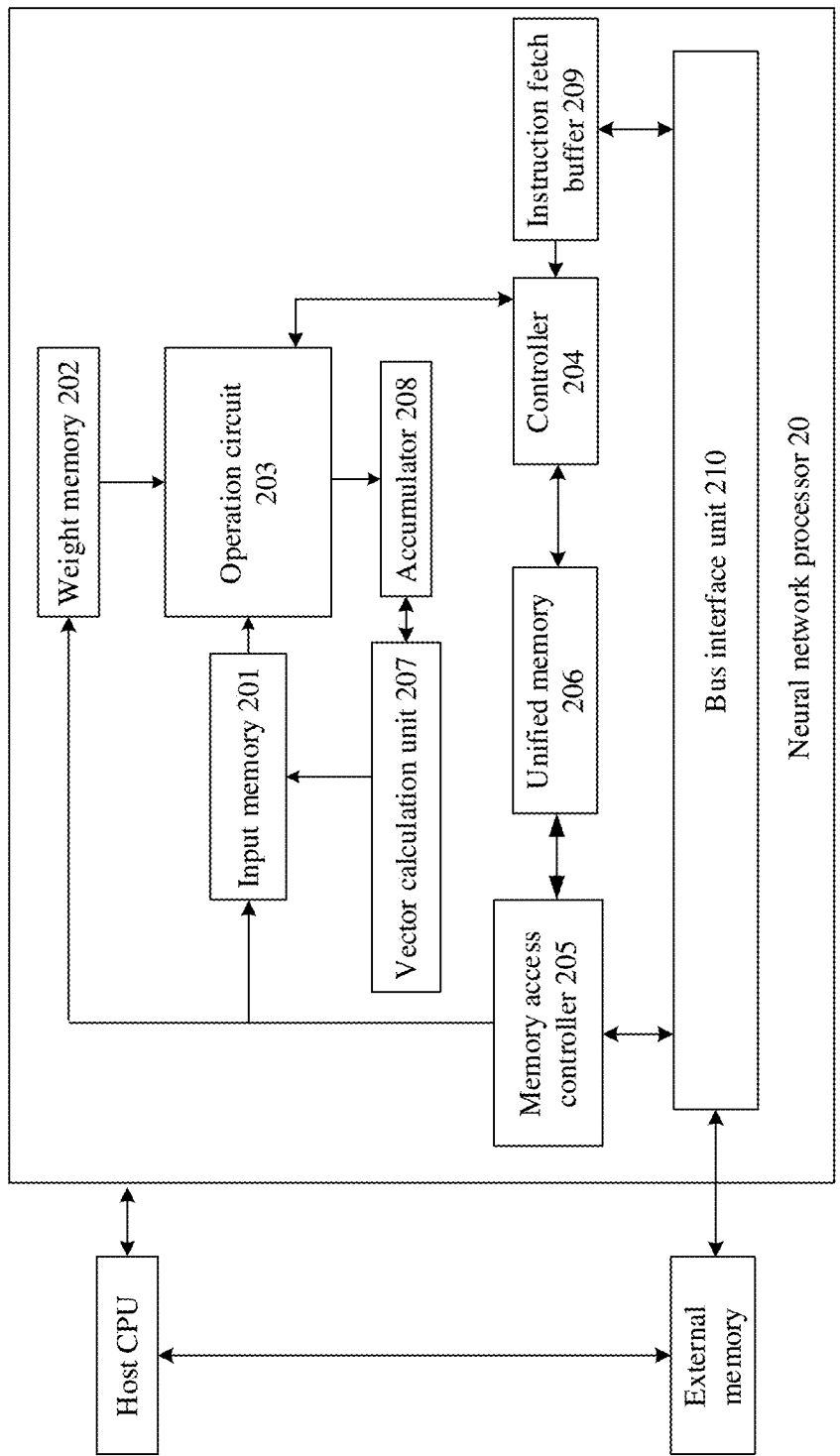
FIG. 4 is a schematic diagram of a hardware structure of a chip according to an embodiment of this application.

FIG. 4 shows a hardware structure of a chip according to an embodiment of this application. The chip includes a neutral network processor 20. The chip may be disposed in the execution device 110 shown in FIG. 3, to complete calculation work of the calculation module 111. The chip may alternatively be disposed in the training device 120 shown in FIG. 3, to complete training work of the training device 120 and output the target model/rule 101.

The neural network processor NPU 20 NPU is mounted to a host CPU as a coprocessor, and the host CPU allocates tasks. A core part of the NPU is an operation circuit 20. A controller 204 controls the operation circuit 203 to extract data in a memory (a weight memory or an input memory) and perform operation.

In some implementations, the operation circuit 203 includes a plurality of processing units (PE) inside. In some implementations, the operation circuit 203 is a two-dimensional systolic array. The operation circuit 203 may alternatively be a one-dimensional systolic array or another electronic circuit that can perform mathematical operation such as multiplication and addition. In some implementations, the operation circuit 203 is a general-purpose matrix processor.

For example, it is assumed that there is an input matrix A, a weight matrix B, and an output matrix C. The operation circuit obtains data corresponding to the matrix B from a weight memory 202, and caches the data on each PE in the operation circuit. The operation circuit obtains data of the matrix A from an input memory 201 and performs matrix operation with the matrix B, and stores an obtained partial result or final result of a matrix into an accumulator 208.

A vector calculation unit 207 may perform further processing on an output of the operation circuit, such as vector multiplication, vector addition, exponential operation, logarithm operation, and size comparison. For example, the vector calculation unit 207 may be used for network calculation of a non-convolutional/non-FC layer in a neural network, such as pooling, batch normalization, and local response normalization.

In some implementations, the vector calculation unit 207 can store vectors output after processing into a unified buffer 206. For example, the vector calculation unit 207 may apply a non-linear function to the output of the operation circuit 203, such as a vector of an accumulated value, to generate an activation value. In some implementations, the vector calculation unit 207 generates a normalized value, a merged value, or both. In some implementations, the vectors output after processing can be used as an activation input to the operation circuit 203, for example, for use in subsequent layers in the neural network.

A unified memory 206 is configured to store input data and output data.

For weight data, the input data in an external memory is transferred to the input memory 201 and/or the unified memory 206, the weight data in the external memory is stored into the weight memory 202, and the data in the unified memory 206 is stored into the external memory by using a direct memory access controller 205 (DMAC).

A bus interface unit (BIU) 210 is configured to implement interaction among the host CPU, the DMAC, and an instruction fetch buffer 209 by using a bus.

The instruction fetch buffer 209 connected to the controller 204 is configured to store an instruction to be used by the controller 204.

The controller 204 is configured to invoke the instruction cached in the instruction fetch buffer 209, to control a working process of the operation accelerator.

Generally, the unified memory 206, the input memory 201, the weight memory 202, and the instruction fetch buffer 209 are all on-chip memories, the external memory is a memory external to the NPU, and the external memory may be a double data rate synchronous dynamic random access memory (DDR SDRAM for short), a high bandwidth memory (HBM), or another readable and writable memory.

The execution device 110 in FIG. 3 described above can perform steps of the speech emotion recognition method in the embodiments of this application, and the chip shown in FIG. 3 may also be configured to perform steps of the speech emotion recognition method in the embodiments of this application. The following describes in detail the speech emotion recognition method in the embodiments of this application with reference to the accompanying drawings.

Figure 5:
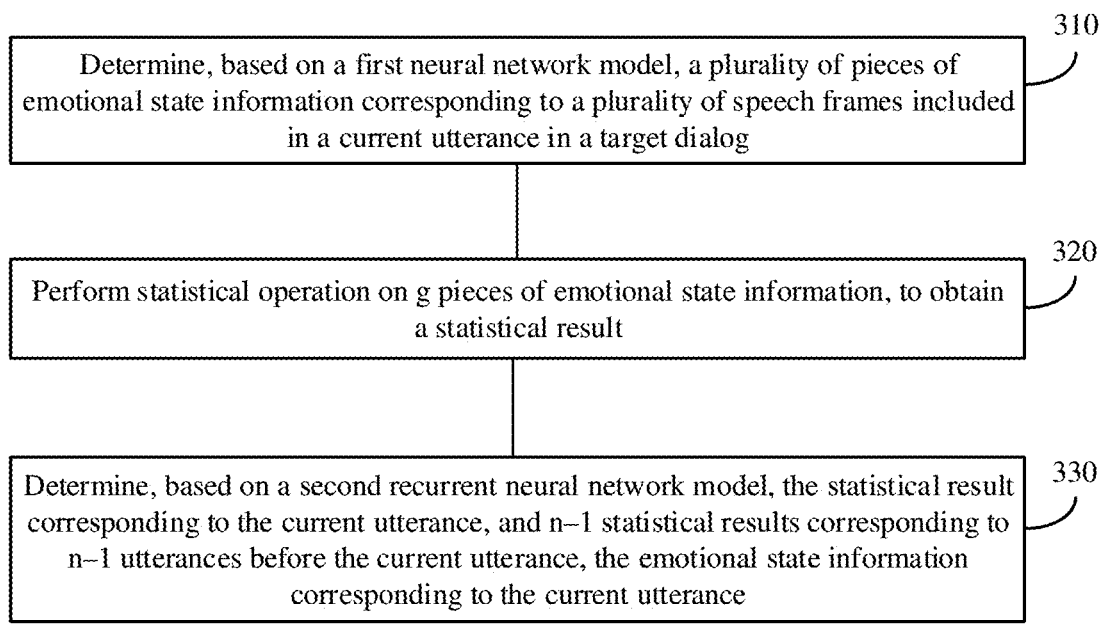
FIG. 5 is a schematic flowchart of a speech emotion recognition method according to an embodiment of this application.

FIG. 5 is a schematic flowchart of a speech emotion recognition method according to this application. The following describes steps in the method. It should be understood that, the method may be performed by a speech emotion recognition apparatus.

S310. Determine, based on a first neural network model, a plurality of pieces of emotional state information corresponding to a plurality of speech frames included in a current utterance (utterance) in a target dialog.

The emotional state information represents an emotional state corresponding to a speech frame. For a method for representing the emotional state information, refer to the foregoing description. Details are not described herein again.

The target dialog is a speech data flow input to the speech emotion recognition apparatus, and may be a real-time speech data flow of a user. However, this is not limited in this application. For the target dialog, the speech emotion recognition apparatus may segment the target dialog into small segments based on an existing speech recognition method or a new speech recognition method that may appear with the development of a technology, and mark a speaker of each small segment.

For example, the speech recognition apparatus may segment the target dialog into small segments by using a voiceprint recognition technology based on speaker switching, where one small segment may be considered one utterance. For example, referring to FIG. 6, based on speaker switching, the target dialog may be segmented into segments $A_1, B_1, A_2, B_2, \ldots, A_{t-1}, B_{t-1}, A_t$, and $B_t$, where A represents one speaker and B represents another speaker.

In another example, the speech recognition apparatus may consider, based on time continuity of speech data, a segment of speech data whose pause time exceeds a preset time (for example, 200 ms) as one utterance. For example, for $A_2$ in FIG. 6, if the speaker A pauses for a period of time, for example, 230 ms, when the speaker A speaks the segment, it may be considered that speech data before the pause in $A_2$ is an utterance $A_{2\text{-}0}$, and speech data starting from the pause to the end of $A_2$ is another utterance $A_{2\text{-}1}$.

It may be understood that utterances determined by using different speech recognition methods are different. Generally, it is considered that one utterance is one sentence, or one utterance may be speech data from the start of speech to the end of speech of a speaker without being interrupted by another person. However, this embodiment of this application is not limited thereto.

Each utterance may be segmented into a plurality of speech frames. For example, each utterance may be segmented into frames based on a frame length of 25 ms and a frame shift of 10 ms, to obtain a plurality of speech frames corresponding to each utterance.

Using a current utterance as an example, a plurality of speech frames may be obtained by segmenting the current utterance into frames. The "plurality of speech frames included in the current utterance" described in this specification may be some or all (a quantity of g) speech frames obtained by segmenting the current utterance into frames. For example, the current utterance may be segmented into frames based on a frame length of 25 ms and a frame shift of 10 ms, and then one frame is selected for every h frames, and a total of g frames are selected as the plurality of speech frames, where h is a positive integer, and g is an integer greater than 1.

After the g speech frames in the current utterance are obtained, emotional state information respectively corresponding to the g speech frames may be obtained based on the first neural network model.

In an implementation, determining, based on the first neural network model, the emotional state information respectively corresponding to the g speech frames includes: for each speech frame in the g speech frames, determining, based on the first neural network model, a feature vector corresponding to the speech frame, and feature vectors respectively corresponding to q-1 speech frames before the speech frame, emotional state information corresponding to the speech frame. The q-1 speech frames are speech frames of a speaker corresponding to the current utterance. For a value of q, refer to the foregoing description. A feature vector of a speech frame k represents an acoustic feature of the speech frame k.

Specifically, for any speech frame k, a window sequence whose length is q may be constituted by using feature vectors respectively corresponding to the q speech frames, and input to the first neural network model, where an output of the first neural network model is emotional state information corresponding to the speech frame k. As described above, the acoustic feature of the speech frame k includes but is not limited to one or more of energy, a fundamental frequency, a zero-crossing rate, a Mel frequency cepstral coefficient (MFCC), and the like, and the foregoing acoustic features may be stitched to obtain the feature vector of the speech frame k.

It should be understood that the q speech frames corresponding to the speech frame k may include only speech frames in an utterance to which the speech frame k belongs, or may include both the speech frames in the utterance to which the speech frame k belongs and a speech frame in another utterance. A specific situation is related to an ordinal of the speech frame in the utterance to which the speech frame belongs.

It should be further understood that q may be a fixed value set at delivery of the speech emotion recognition apparatus, or may be an unfixed value. For example, q may be set by a user. This is not limited in this application.

Optionally, in the foregoing q speech frames, any two speech frames may be spaced by m speech frames, and a definition of m is described above.

Figure 7:
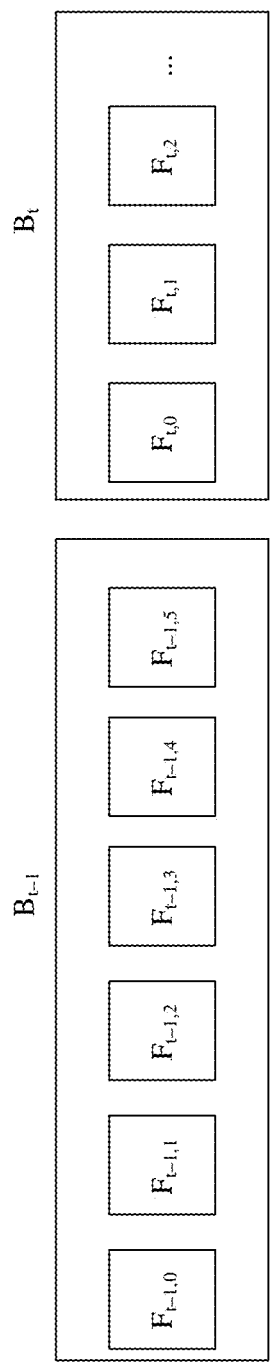
FIG. 7 is a schematic diagram of segmenting an utterance into speech frames.

Description is provided by using utterances $B_t$ and $B_{t-1}$ shown in FIG. 7 as an example. Referring to FIG. 7, the utterance $B_t$ is segmented into speech frames $F_{t,0}$, $F_{t,1}$, $F_{t,2}$, ..., and the utterance $B_{t-1}$ is segmented into speech frames $F_{t-1,0}$, $F_{t-1,1}$, $F_{t-1,2}$, $F_{t-1,3}$, $F_{t-1,4}$, and $F_{t-1,5}$. It is assumed that q=4, and g speech frames included in the utterance $B_t$ include the speech frame $F_{t,0}$. In this case, if m=0, q speech frames corresponding to the speech frame $F_{t,0}$ may be $F_{t,0}$, $F_{t-1,5}$, $F_{t-1,4}$, and $F_{t-1,3}$. If m=1, q speech frames corresponding to the speech frame $F_{t,0}$ may be $F_{t,0}$, $F_{t-1,4}$, $F_{t-1,2}$, and $F_{t-1,0}$.

Based on this technical solution, when m is not 0, a context included in a window corresponding to the speech frame k can be enlarged when a window sequence is prevented from being excessively long, so that accuracy of a prediction result can be further improved.

S320. Perform statistical operation on g pieces of emotional state information, to obtain a statistical result, where the statistical result is a statistical result corresponding to the current utterance.

For example, statistics in this application include but are not limited to an average, a variance, an extremum, a coefficient of linear fitting, and a coefficient of higher order fitting.

S330. Determine, based on a second recurrent neural network model, the statistical result corresponding to the current utterance, and n-1 statistical results corresponding to n-1 utterances before the current utterance, the emotional state information corresponding to the current utterance.

The n-1 utterances are in a one-to-one correspondence with the n-1 second statistical results. That is, one utterance corresponds to one statistical result. A statistical result corresponding to any utterance in the n-1 utterances is obtained by performing statistical operation on the g pieces of emotional state information corresponding to the g speech frames included in the utterance. The n-1 utterances belong to the target dialog, and n is an integer greater than 1.

By using the current utterance as an example, the foregoing describes in detail how to determine the emotional state information respectively corresponding to the g speech frames included in the current utterance, so as to further determine the statistical result corresponding to the current utterance. For any utterance in the n-1 utterances, a method for determining the emotional state information respectively corresponding to the plurality of speech frames included in the utterance is similar to a method for determining the emotional state information respectively corresponding to the g speech frames included in the current utterance, and details are not described herein again. Then, the n-1 statistical results corresponding to the n-1 utterances may be further determined.

It should be understood that, during specific implementation, actually, the speech emotion recognition apparatus may determine, in a time sequence, a corresponding statistical result each time one utterance is received. In other words, if the current utterance is $B_t$ shown in FIG. 6, the speech emotion recognition apparatus may successively determine statistical results corresponding to utterances before $B_t$.

It should be noted that, the method provided in this application may be applied to two scenarios. (1) Each utterance input to the speech emotion recognition apparatus has a corresponding emotional state information output. In this scenario, if a quantity of the utterances before the current utterance is less than n-1, for example, the current utterance is $A_1$ shown in FIG. 6, a first default value (for example, 0) may be used to fill the n-1 utterances. In addition, it is considered that statistical results corresponding to these utterances that are default values are all second default values. It should be understood that the first default value and the second default value may be the same or different. (2) The input speech emotion recognition apparatus outputs emotional state information only when a quantity of utterances input to the speech emotion recognition apparatus reaches n. In other words, no corresponding emotional state information is output for the first to the $(n-1)^{th}$ utterances. That is, the problem in the first scenario described above does not need to be considered.

According to the method provided in this application, the plurality of pieces of emotional state information corresponding to the plurality of speech frames in the current utterance can be obtained based on the first neural network model, and then the emotional state information corresponding to the current utterance can be obtained based on the second neural network device, the statistical result corresponding to the current utterance, and the statistical results corresponding to the plurality of utterances before the current utterance. Therefore, impact of a context of the current utterance on the emotional state information corresponding to the current utterance can be learned more fully by using the two levels of neural network models: the first neural network model and the second neural network model, so that a more accurate speech emotion recognition effect can be achieved.

Optionally, the method may further include: presenting the emotional state information corresponding to the current utterance to a user.

That is, a prediction result may be presented to the user after the emotional state information corresponding to the current utterance is determined.

Further, the method may include: obtaining a correction operation performed by the user on the emotional state information corresponding to the current utterance.

Specifically, if the presented prediction result is inaccurate, the user may further correct the prediction result.

Optionally, the n-1 utterances are adjacent in terms of time. In other words, there is no other speech data between any two utterances in the n-1 utterances.

Figure 6:
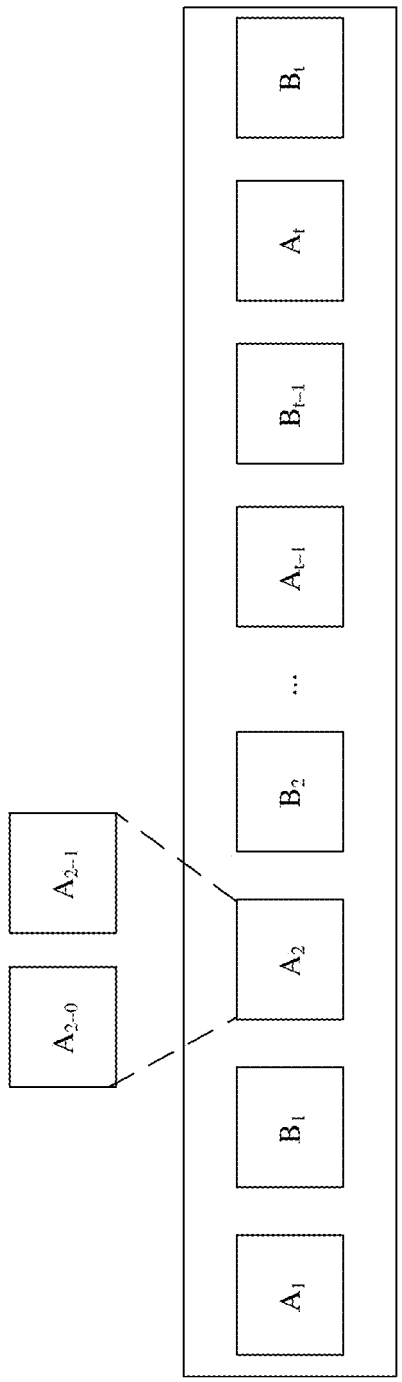
FIG. 6 is a schematic diagram of segmenting a speech flow into utterances.

Using FIG. 6 as an example, if the current utterance is $B_t$, the n-1 utterances may be $A_1, B_1, A_2, B_2, \ldots, A_{t-1}, B_{t-1}$, and $A_t$, or may be $A_2, B_2, \ldots, A_{t-1}$, and $B_{t-1}$. It should be understood that, two utterances such as $A_1$ and $A_2$ cannot be referred to as being adjacent to each other, because the two utterances are spaced by one utterance, namely, $B_1$.

In addition, any two utterances in the n-1 utterances may alternatively not be adjacent to each other. For example, if the target dialog is a dialog between two speakers, any two utterances in the n-1 utterances may be spaced by one or two utterances.

Further, the n-1 utterances include speech data of a plurality of speakers. That is, the n-1 utterances are dialogs of a plurality of speakers.

For example, if the current utterance is $B_2$ shown in FIG. 6, the n-1 utterances may include $A_1, B_1$, and $A_2$, that is, the n-1 utterances include speech data of A and B.

In addition, the n-1 utterances may alternatively include only utterances of a speaker corresponding to the current utterance. For example, the current utterance corresponds to a speaker A, and the speaker A always speaks before the current utterance. In this case, the n-1 utterances do not include an utterance corresponding to another person.

Based on this solution, speech recognition is performed based on a context of a speaker. Compared with performing speech emotion recognition based on a sentence of a speaker in a conventional technology, a more accurate speech emotion recognition effect can be achieved.

In an implementation of S330, the n statistical results, namely, the statistical result corresponding to the current utterance and the n-1 statistical results may be input to the second neural network model, and an output of the second neural network model is the emotional state information corresponding to the current utterance.

In other words, the input of the second neural network model is the n statistical results. Based on this solution, no processing needs to be performed on the statistical results, and implementation is relatively simple.

Further, the emotional state information corresponding to the current utterance may alternatively be determined based on genders of speakers corresponding to the current utterance and the n-1 utterances.

For example, the n statistical results and the genders of the speakers corresponding to the current utterance and the n-1 utterances may be input to the second neural network model, and the second neural network model outputs the emotional state information corresponding to the current utterance.

When speech emotion recognition is performed with reference to the genders of the speakers, a more accurate recognition result can be achieved.

In another implementation of S330, the emotional state information corresponding to the current utterance may be determined based on the second neural network model and w round features.

The n utterances: the n-1 utterances and the current utterance, correspond to w rounds of dialogs, or in other words, the n utterances correspond to w rounds, where w is an integer greater than 1. Optionally, round division may be based on speaker division. FIG. 6 is used as an example for description. It is determined that a speaker corresponding to $A_2$ is A, and the most recent utterance corresponding to A is $A_1$. Then, utterances starting from $A_1$ to an utterance before $A_2$ are classified into one round, namely, $A_1$ and $B_1$ are one round of dialog.

As described above, the n utterances: the n-1 utterances and the current utterance, correspond to the w rounds. A round feature corresponding to any round may be determined based on statistical results corresponding to utterances of all speakers in the round.

Specifically, for example, each round includes speech data of two speakers: A and B. The round feature corresponding to any round is determined based on a statistical result corresponding to A and a statistical result corresponding to B in this round of dialog. For example, a round feature corresponding to a current round corresponding to the current utterance is vector stitching of statistical results corresponding to utterances included in the current round. Further, the round feature may alternatively be determined based on genders of A and B. For example, the round feature corresponding to the current round corresponding to the current utterance is vector stitching of the statistical results corresponding to the utterances included in the current round and genders of speakers corresponding to the current round. In this application, the w round features may be input to the second neural network model, and an output of the second neural network model is the emotional state information corresponding to the current utterance.

Therefore, according to the method provided in this application, speech emotion recognition is performed based on the speech data of the plurality of speakers before the current utterance, namely, based on context information of a plurality of rounds of dialogs. Compared with performing speech emotion recognition based on a single sentence in the conventional technology, a more accurate speech emotion recognition effect can be achieved.

Different from the previous implementation of S330, in this implementation, after the statistical result corresponding to each utterance in each round is processed, the processed statistical result is then input to the second neural network model.

It should be understood that, when the input of the second neural network model is the round features, a value of w needs to be set, but a value of n does not need to be set. When the input of the second neural network model is the statistical results corresponding to the utterances, the value of n needs to be set, but the value of w does not need to be set.

Optionally, w may be an obtained input of the user. For example, an interface on which the user is required to enter the value of w may be presented to the user, and the user may determine the value of w. In another example, a plurality of values of w may be presented to the user, and the user selects one value of w.

Optionally, the emotional state information corresponding to the current utterance may be further presented to the user after the emotional state information corresponding to the current utterance is determined. The user may correct the prediction result, and if the correction operation performed by the user on the emotional state information corresponding to the current utterance is obtained, the value of w may be updated.

Further, a process of updating the value of w may be setting the value of w, and predicting the emotional state information corresponding to the current utterance again. If the prediction result matches a result entered by the user, the value of w set at this time is used as the updated value of w; otherwise, the value of w is reset again, and the emotional state information corresponding to the current utterance is predicted until the prediction result matches the result entered by the user, and the value of w that matches the result entered by the user is used as the updated value of w.

In other words, if a prediction result is not expected by the user, the user may correct the prediction result. After recognizing the correction operation of the user, a speech emotion recognition apparatus may update the value of w, to achieve a more accurate prediction result.

It should be noted that, if the current round corresponding to the current utterance includes only speech of the speaker corresponding to the current utterance, a statistical result corresponding to another speaker in the current round may be set to a default value.

The following Table 1 shows an experimental result of speech emotion recognition according to the method in this application. It should be understood that numbers in the first row in Table 1 are values of w.

Specifically, an experiment is conducted by using an open database IEMOCAP, which includes five dialogs. Each dialog includes several segments of dialog speech. Each segment of dialog includes 10 to 90 utterances, and average duration of the utterances is 2 to 5 seconds.

The experiment uses a manner of cross validation. To be specific, four dialogs are recurrently used for training, and the remaining one dialog is tested. Finally, prediction results of all the five dialogs are obtained. An unweighted average recall (UAR) is used as an evaluation indicator, and an emotional state is predicted separately from two dimensions: valence and activation. Experimental results are as follows:

Therefore, according to the method provided in this application, speech emotion recognition is performed based on context information of a plurality of rounds of dialogs, so that a more accurate speech emotion recognition effect can be achieved.

The speech emotion recognition method in this embodiment of this application is described above in detail with reference to FIG. 5 to FIG. 7. The following describes a speech emotion recognition apparatus in an embodiment of this application with reference to FIG. 8. It should be understood that the steps in the method shown in FIG. 5 may be performed by the speech emotion recognition apparatus shown in FIG. 8, and the foregoing related descriptions and limitations of the speech emotion recognition method are also applicable to the speech emotion recognition apparatus shown in FIG. 8. The following appropriately omits repeated descriptions when describing the speech emotion recognition apparatus shown in FIG. 8.

Figure 8:
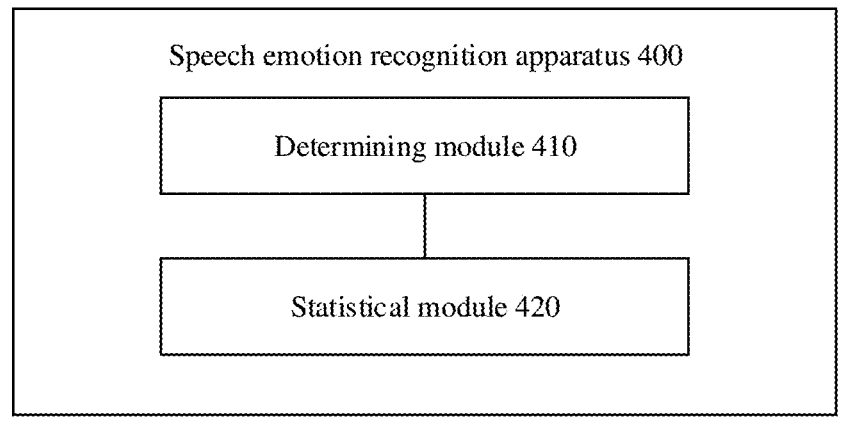
FIG. 8 is a schematic block diagram of a speech emotion recognition apparatus according to an embodiment of this application.

FIG. 8 is a schematic block diagram of a speech emotion recognition apparatus according to an embodiment of this application. The speech emotion recognition apparatus 400 shown in FIG. 8 includes a determining module 410 and a statistical module 420.

The determining module 410 is configured to determine, based on a first neural network model, a plurality of pieces of emotional state information corresponding to a plurality of speech frames included in a current utterance in a target dialog, where one speech frame corresponds to one piece of emotional state information, and the emotional state information represents an emotional state corresponding to the speech frame.

The statistical module 420 is configured to perform statistical operation on the plurality of pieces of emotional state information to obtain a statistical result, where the statistical result is a statistical result corresponding to the current utterance.

The determining module 410 is further configured to determine, based on a second neural network model, the statistical result corresponding to the current utterance, and n-1 statistical results corresponding to n-1 utterances before the current utterance, the emotional state information corresponding to the current utterance.

The n-1 utterances are in a one-to-one correspondence with the n-1 statistical results, a statistical result corresponding to any utterance in the n-1 utterances is obtained by performing statistical operation on a plurality of pieces of emotional state information corresponding to a plurality of

TABLE 1

| | | Length of text | | | |
|---|---|---|---|---|---|
| | No dialog context | 5 | 10 | 15 | 20 |
| Valence | 50.04 ± 8.19 | 64.66 ± 6.73 | 72.32 ± 8.05 | 65.55 ± 9.11 | 69.28 ± 8.60 |
| Activation | 46.50 ± 7.32 | 48.83 ± 7.25 | 58.16 ± 6.13 | 63.99 ± 9.33 | 68.20 ± 8.90 |

The foregoing Table 1 shows UARs obtained by using context windows with different lengths in a dialog-level LSTM model.

Compared with a single-level LSTM, it can be learned that the prediction result is significantly improved after historical dialog rounds are considered. The highest UAR of valence is 72.32%, and the highest UAR of activation is 68.20%.

speech frames included in the utterance, the n-1 utterances belong to the target dialog, and n is an integer greater than 1.

According to the apparatus provided in this application, the plurality of pieces of emotional state information corresponding to the plurality of speech frames in the current utterance can be obtained based on the first neural network model, and then the emotional state information corresponding to the second neural network device, the statistical result corresponding to the current utterance, and the statistical results corresponding to the plurality of utterances before the current utterance. Therefore, impact of a context of the current utterance on the emotional state information corresponding to the current utterance can be learned more fully by using the two levels of neural network models: the first neural network model and the second neural network model, so that a more accurate speech emotion recognition effect can be achieved.

It should be understood that, division of the foregoing modules is merely functional division, and there may be another division method in actual implementation.

Figure 9:
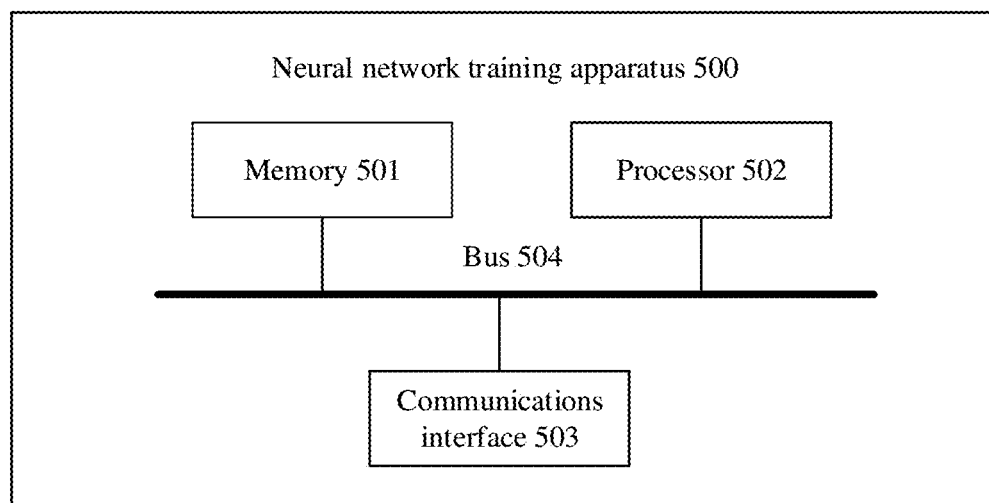
FIG. 9 is a schematic structural diagram of hardware of a neutral network training apparatus according to an embodiment of this application.

FIG. 9 is a schematic structural diagram of hardware of a neural network training apparatus according to an embodiment of this application. The neural network training apparatus 500 (the apparatus 500 may be specifically a computer device) shown in FIG. 9 includes a memory 501, a processor 502, a communications interface 503, and a bus 504. The memory 501, the processor 502, and the communications interface 503 implement a communication connection with each other by using the bus 504.

The memory 501 may be a read only memory (ROM), a static storage device, a dynamic storage device, or a random access memory (RAM). The memory 501 may store programs. When the programs stored in the memory 501 are executed by the processor 502, the processor 502 and the communications interface 503 are configured to perform steps of a neural network training method in an embodiment of this application.

The processor 502 may be a general-purpose central processing unit (CPU), a microprocessor, an application-specific integrated circuit (ASIC), a graphics processing unit (GPU), or one or more integrated circuits, configured to execute related programs, to implement functions that need to be executed by the units in the neural network training apparatus in this embodiment of this application, or perform the neutral network training method in a method embodiment of this application.

The processor 502 may be an integrated circuit chip and has a signal processing capability. In an implementation process, steps of the neural network training method in this application may be completed by using an integrated logic circuit of hardware in the processor 502, or by using instructions in a form of software. The foregoing processor 502 may be a general-purpose processor, a digital signal processor (digital signal processing, DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware in the decoding processor and a software module. A software module may be located in a mature storage medium in the art, for example, a random access memory, a flash memory, a read-only memory, a programmable read-only memory, an electrically erasable programmable memory, or a register. The storage medium is located in the memory 501. The processor 502 reads information in the memory 501, and completes, in combination with hardware of the processor 502, functions that need to be performed by units included in the neural network training apparatus in this embodiment of this application, or performs the neural network training method in a method embodiment of this application.

The communications interface 503 uses a transceiver apparatus, for example, but not limited to a transceiver, to implement communication between the apparatus 500 and another device or a communications network. For example, a training corpus may be obtained by using the communications interface 503.

The bus 504 may include a path that transmits information between various components (for example, the memory 501, the processor 502, and the communications interface 503) of the apparatus 500.

Figure 10:
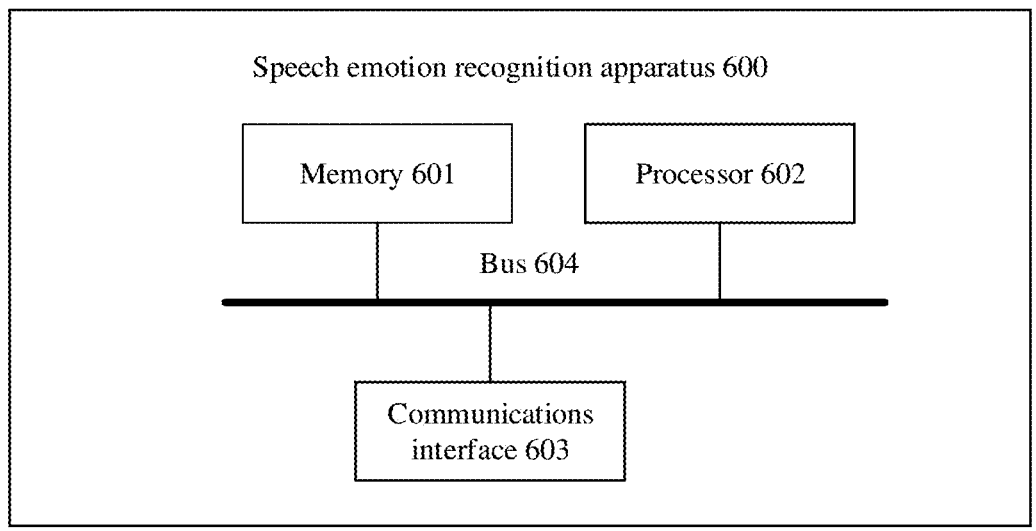
FIG. 10 is a schematic structural diagram of hardware of a speech emotion recognition apparatus according to an embodiment of this application.

FIG. 10 is a schematic structural diagram of hardware of a speech emotion recognition apparatus according to an embodiment of this application. The speech emotion recognition apparatus 600 shown in FIG. 10 (the apparatus 600 may be specifically a computer device) includes a memory 601, a processor 602, a communications interface 603, and a bus 604. The memory 601, the processor 602, and the communications interface 603 implement a communication connection with each other by using the bus 604.

The memory 601 may be a ROM, a static storage device, or a RAM. The memory 601 may store programs. When the programs stored in the memory 601 are executed by the processor 602, the processor 602 and the communications interface 603 are configured to perform the steps of the speech emotion recognition method in an embodiment of this application.

The processor 602 may be a general-purpose CPU, a microprocessor, an ASIC, a GPU, or one or more integrated circuits, configured to execute related programs, to implement functions that need to be performed by modules in speech emotion recognition in this embodiment of this application, or perform the speech emotion recognition method in a method embodiment of this application.

The processor 602 may be an integrated circuit chip and has a signal processing capability. In an implementation process, steps of the speech emotion recognition method in this embodiment of this application may be completed by using an integrated logic circuit of hardware in the processor 602 or an instruction in a form of software. The foregoing processor 602 may further be a general-purpose processor, a DSP, an ASIC, an FPGA or another programmable logic device, a discrete gate or transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware in the decoding processor and a software module. A software module may be located in a mature storage medium in the art, for example, a random access memory, a flash memory, a read-only memory, a programmable read-only memory, an electrically erasable programmable memory, or a register. The storage medium is located in the memory 601. The processor 602 reads information in the memory 601, and completes, in combination with hardware of the processor 602, functions that need to be performed by modules included in the speech emotion recognition apparatus in this embodiment of this application, or performs the speech emotion recognition method in a method embodiment of this application.

The communications interface 603 uses a transceiver apparatus, for example, but not limited to a transceiver, to implement communication between the apparatus 600 and another device or a communications network. For example, a training corpus may be obtained by using the communications interface 603.

The bus 604 may include a path that transmits information between various components (for example, the memory 601, the processor 602, and the communications interface 603) of the apparatus 600.

It should be understood that, the determining module 410 and the statistical module 420 in the speech emotion recognition apparatus 400 are equivalent to the processor 602.

It should be noted that although the apparatuses 500 and 600 shown in FIG. 9 and FIG. 10 show only the memory, the processor, and the communications interface, in a specific implementation process, a person skilled in the art should understand that the apparatuses 500 and 600 further include another component necessary for normal operation. In addition, according to a specific requirement, a person skilled in the art should understand that the apparatus 500 and 600 may further include hardware components for implementing other additional functions. In addition, a person skilled in the art should understand that the apparatus 500 and the apparatus 600 may include only components required for implementing the embodiments of this application, but do not need to include all components shown in FIG. 9 or FIG. 10.

It may be understood that the apparatus 500 is equivalent to the training device 120 in 1, and the apparatus 600 is equivalent to the execution device 110 in FIG. 1.

Based on the methods provided in the embodiments of this application, this application further provides a computer program product. The computer program product includes computer program code. When the computer program code is run on a computer, the computer is enabled to perform the methods described above.

Based on the methods provided in the embodiments of this application, this application further provides a computer-readable medium. The computer-readable medium stores program code. When the program code is run on a computer, the computer is enabled to perform the methods described above.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer program instructions are loaded or executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It should be further understood that, in this application, "when", "if", and "in a case in which" all mean that a terminal device or a network device performs corresponding processing in an objective situation, and are not intended to limit time. In addition, it is not required that the terminal device or the network device should have to perform a determining action, and it does not mean that another limitation exists.

The term "and/or" in this specification describes only an association relationship for associated objects and represents that three relationships may exist. For example, A and/or B may represent the following three cases: Only A exists, both A and B exist, and only B exists.

In this specification, the term "at least one of . . . " indicates all listed items or any combination thereof. For example, "at least one of A, B, and C" may indicate six cases: A exists alone, B exists alone, C exists alone, A and B exist together, B and C exist together, and A, B and C exist together.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

In the embodiments of this application, if there is no special description or logical conflict, and terms and/or descriptions in different embodiments are consistent and may be mutually referenced, technical features in the different embodiments may be combined to form a new embodiment based on an internal logical relationship.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, based on a first neural network model, a plurality of pieces of emotional state information corresponding to a plurality of speech frames comprised in a current utterance in a target dialog, wherein the plurality of speech frames have a one-to-one correspondence with the plurality of pieces of emotional state information, and each piece of emotional state information represents an emotional state corresponding to a corresponding speech frame;
   performing a statistical operation on the plurality of pieces of emotional state information to obtain a statistical result, wherein the statistical result corresponds to the current utterance; and
   determining emotional state information corresponding to the current utterance, the determining being based on a second neural network model, the statistical result corresponding to the current utterance, and n-1 statistical results corresponding to n-1 utterances before the current utterance; and
   wherein the n-1 utterances have a one-to-one correspondence with the n-1 statistical results, a statistical result corresponding to each utterance in the n-1 utterances is obtained by performing a statistical operation on a plurality of pieces of emotional state information corresponding to a plurality of speech frames comprised in the respective utterance, the n-1 utterances belong to the target dialog, and n is an integer greater than 1.

2. The method according to claim 1, wherein utterances of the n-1 utterances are adjacent to each other in time.

3. The method according to claim 2, wherein determining the emotional state information corresponding to the current utterance, the determining being based on the second neural network model, the statistical result corresponding to the current utterance, and the n-1 statistical results corresponding to n-1 utterances before the current utterance, comprises:
   determining, based on the statistical result corresponding to the current utterance and the n-1 statistical results, round features corresponding to w rounds corresponding to n utterances, wherein the n utterances comprise the current utterance and the n-1 utterances, and wherein a round feature corresponding to each round of the w rounds is determined based on statistical results corresponding to utterances of all speakers in the respective round, and w is an integer greater than or equal to 1; and
   determining, based on the second neural network model and the round features corresponding to the w rounds, the emotional state information corresponding to the current utterance.

4. The method according to claim 3, wherein w is a value entered by a user.

5. The method according to claim 3, further comprising: updating a value of w.

6. The method according to claim 1, wherein the n-1 utterances correspond to a plurality of speakers.

7. The method according to claim 6, wherein the n-1 plurality of speakers comprise a speaker corresponding to the current utterance; and
   wherein determining the emotional state information corresponding to the current utterance, the determining being based on the second neural network model, the statistical result corresponding to the current utterance, and the n-1 statistical results corresponding to n-1 utterances before the current utterance, comprises:
   determining the emotional state information corresponding to the current utterance, the determining being based on the second neural network model, the statistical result corresponding to the current utterance, the n-1 statistical results, and genders of the plurality of speakers.

8. The method according to claim 1, wherein determining, based on the first neural network model, the plurality of pieces of emotional state information corresponding to the plurality of speech frames comprised in the current utterance in the target dialog comprises:
   for each speech frame in the plurality of speech frames, determining emotional state information corresponding to the speech frame, the determining being based on the first neural network model, a feature vector corresponding to the respective speech frame, and feature vectors respectively corresponding to q-1 speech frames before the speech frame, and wherein the q-1 speech frames are speech frames of the speaker corresponding to the current utterance, q is an integer greater than 1, and a feature vector of a speech frame k represents an acoustic feature of the speech frame k.

9. The method according to claim 8, wherein any two speech frames in the q speech frames are spaced by m speech frames, wd herein m is an integer greater than or equal to 0.

10. The method according to claim 1, further comprising:
presenting the emotional state information corresponding to the current utterance to a user; and
obtaining a correction operation performed by the user on the emotional state information corresponding to the current utterance.

11. The method according to claim 1, wherein the first neural network model is a long short-term memory (LSTM) model, or the second neural network model is an LSTM model.

12. An apparatus, comprising:
a non-transitory memory, configured to store programs; and
a processor, configured to execute the programs stored in the memory, wherein when at least one program stored in the memory is executed, the processor is configured to:
determine, based on a first neural network model, a plurality of pieces of emotional state information corresponding to a plurality of speech frames comprised in a current utterance in a target dialog, wherein the plurality of speech frames have a one-to-one correspondence with the plurality of pieces of emotional state information, and each piece of emotional state information represents an emotional state corresponding to the corresponding speech frame;
perform a statistical operation on the plurality of pieces of emotional state information to obtain a statistical result, wherein the statistical result corresponds to the current utterance; and
determine emotional state information corresponding to the current utterance, the determining being based on a second neural network model, the statistical result corresponding to the current utterance, and n-1 statistical results corresponding to n-1 utterances before the current utterance; and
wherein the n-1 utterances have a one-to-one correspondence with the n-1 statistical results, a statistical result corresponding to each utterance in the n-1 utterances is obtained by performing statistical operation on a plurality of pieces of emotional state information corresponding to a plurality of speech frames comprised in the respective utterance, the n-1 utterances belong to the target dialog, and n is an integer greater than 1.

13. The apparatus according to claim 12, wherein utterances of the n-1 utterances are adjacent to each other in time.

14. The apparatus according to claim 13, wherein when the at least one program stored in the memory is executed, the processor is configured to:
determine, based on the statistical result corresponding to the current utterance and the n-1 statistical results, round features corresponding to w rounds corresponding to n utterances, wherein the n utterances comprise the current utterance and the n-1 utterances, and wherein a round feature corresponding to each round is determined based on statistical results corresponding to utterances of all speakers in the respective round, and w is an integer greater than or equal to 1; and
determine, based on the second neural network model and the round features corresponding to the w rounds, the emotional state information corresponding to the current utterance.

15. The apparatus according to claim 14, wherein w is a value entered by a user.

16. The apparatus according to claim 14, wherein when the at least one program stored in the memory is executed, the processor is configured to:
update a value of w.

17. The apparatus according to claim 12, wherein the n-1 utterances comprise speech data of a plurality of speakers.

18. The apparatus according to claim 17, wherein the plurality of speakers comprise a speaker corresponding to the current utterance; and
wherein when the at least one program stored in the memory is executed, the processor is configured to:
determine the emotional state information corresponding to the current utterance, the determining being based on the second neural network model, the statistical result corresponding to the current utterance, the n-1 statistical results, and genders of the plurality of speakers.

19. The apparatus according to claim 12, wherein when the at least one program stored in the memory is executed, the processor is configured to:
for each speech frame in the plurality of speech frames, determine emotional state information corresponding to the respective speech frame, the determining being based on the first neural network model, a feature vector corresponding to the respective speech frame, and feature vectors respectively corresponding to q-1 speech frames before the speech frame, and wherein the q-1 speech frames are speech frames of the speaker corresponding to the current utterance, q is an integer greater than 1, and a feature vector of a speech frame k represents an acoustic feature of the speech frame k.

20. The apparatus according to claim 19, wherein any two speech frames in the q speech frames are spaced by m speech frames, wherein m is an integer greater than or equal to 0.

21. The apparatus according to claim 12, wherein when the at least one program stored in the memory is executed, the processor is further configured to:
present the emotional state information corresponding to the current utterance to a user; and
obtain a correction operation performed by the user on the emotional state information corresponding to the current utterance.

22. The apparatus according to claim 12, wherein the first neural network model is a long short-term memory (LSTM) model or the second neural network model is an LSTM model.

23. A non-transitory computer readable storage medium storing executable instructions, the executable instructions including instructions for:
determining, based on a first neural network model, a plurality of pieces of emotional state information corresponding to a plurality of speech frames comprised in a current utterance in a target dialog, wherein the plurality of speech frames have a one-to-one correspondence with the plurality of pieces of emotional state information, and each piece of emotional state information represents an emotional state corresponding to a corresponding speech frame;
performing a statistical operation on the plurality of pieces of emotional state information to obtain a statistical result, wherein the statistical result corresponds to the current utterance; and
determining emotional state information corresponding to the current utterance, the determining being based on a second neural network model, the statistical result corresponding to the current utterance, and n-1 statistical results corresponding to n-1 utterances before the current utterance; and wherein the n-1 utterances have a one-to-one correspondence with the n-1 statistical results, a statistical result corresponding to each utterance in the n-1 utterances is obtained by performing a statistical operation on a plurality of pieces of emotional state information corresponding to a plurality of speech frames comprised in the respective utterance, the n-1 utterances belong to the target dialog, and n is an integer greater than 1.

* * * * *

UNITED STATES PATENT AND TRADEMARK OFFICE
CERTIFICATE OF CORRECTION

PATENT NO. : 11,900,959 B2
APPLICATION NO. : 17/451061
DATED : February 13, 2024
INVENTOR(S) : Zhang et al.

It is certified that error appears in the above-identified patent and that said Letters Patent is hereby corrected as shown below:

In the Claims

In Column 24, in Claim 7, Line 37, delete "the n-1" and insert -- the --.

Signed and Sealed this
Thirtieth Day of April, 2024

Katherine Kelly Vidal
*Director of the United States Patent and Trademark Office*